March 27, 1956  W. J. SCHENKEL ET AL  2,739,833
COLLAPSIBLE ONE AND TWO STORY HOUSE TRAILER
Filed Sept. 26, 1952  4 Sheets-Sheet 1

INVENTORS
WILLIAM J. SCHENKEL,
EARL E. SCHENKEL,
BY McMorrow, Berman & Davidson
ATTORNEYS.

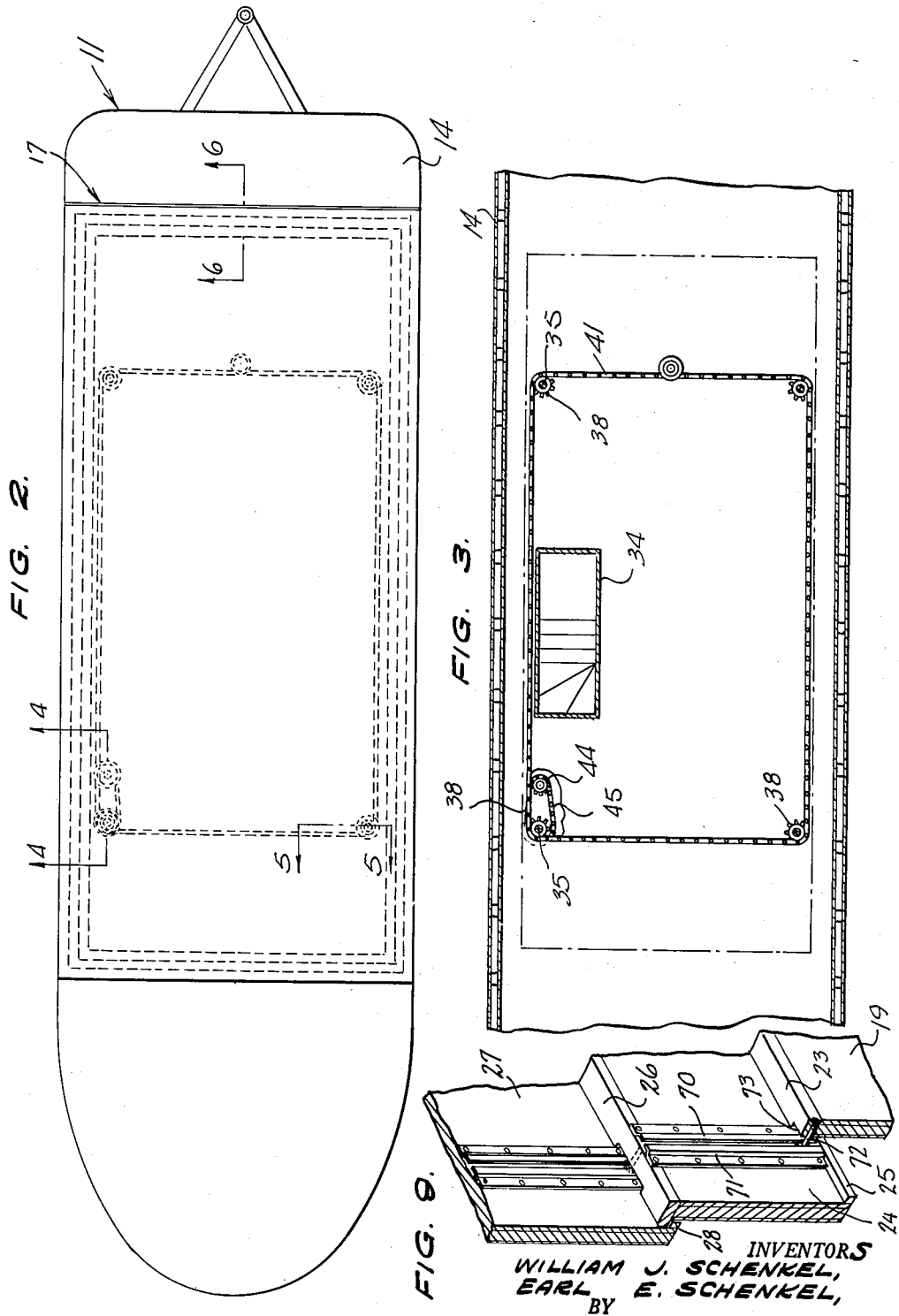

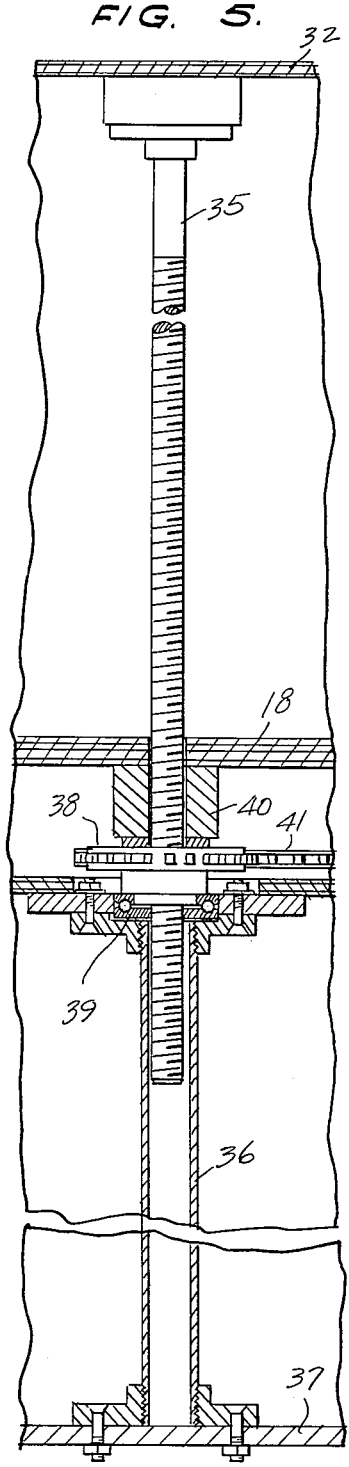
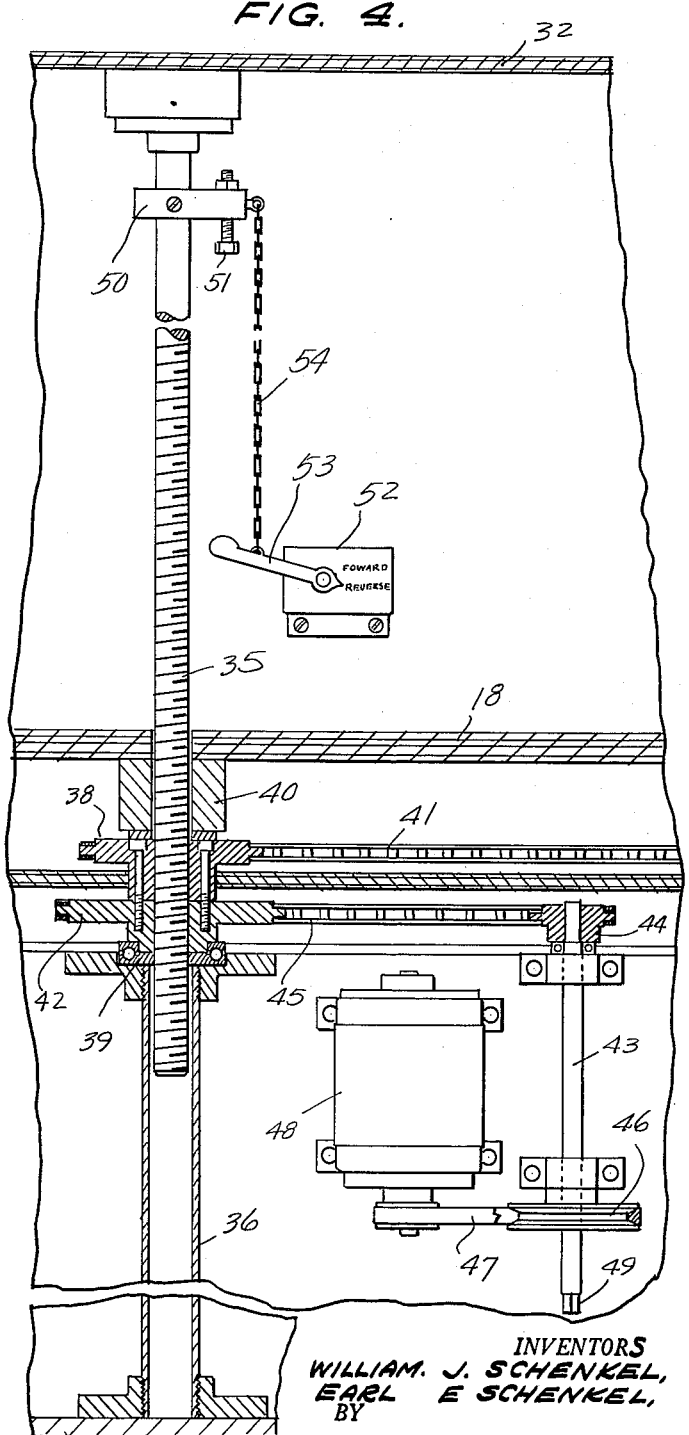

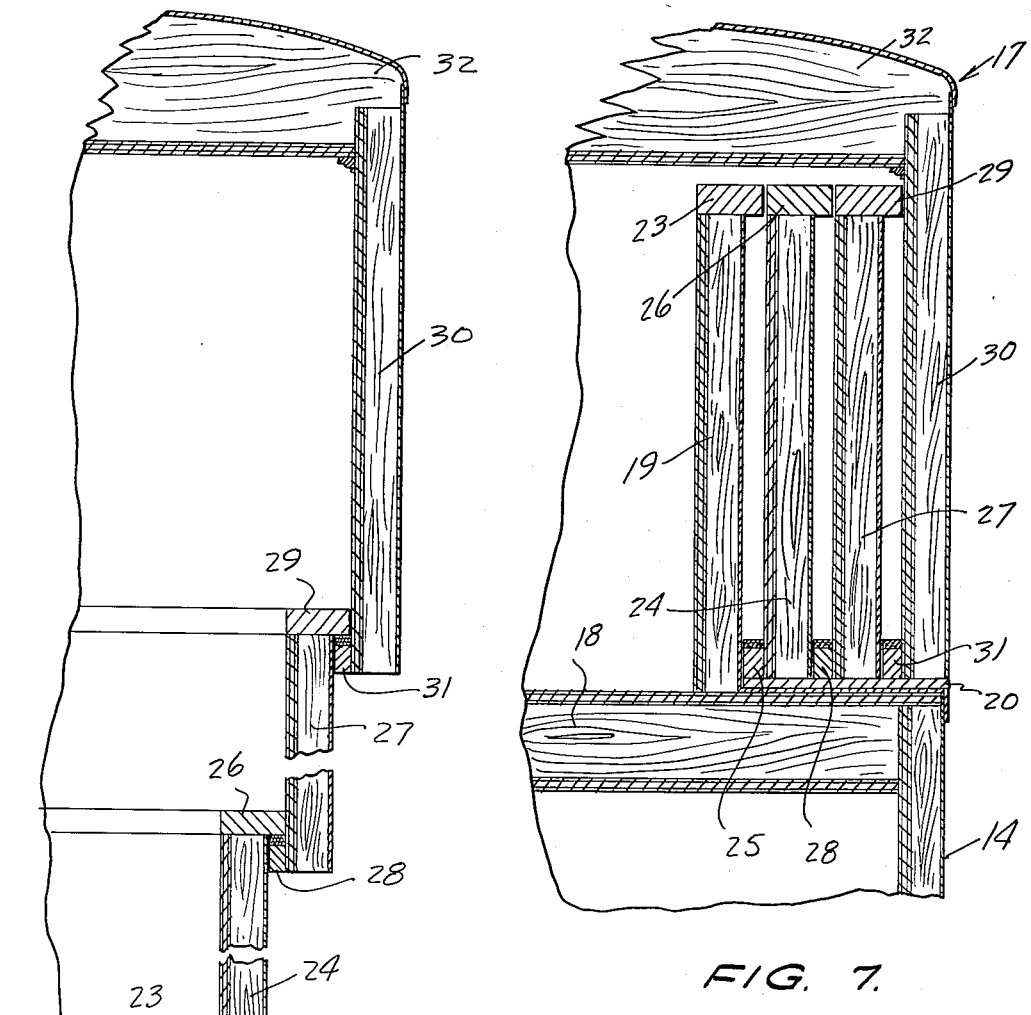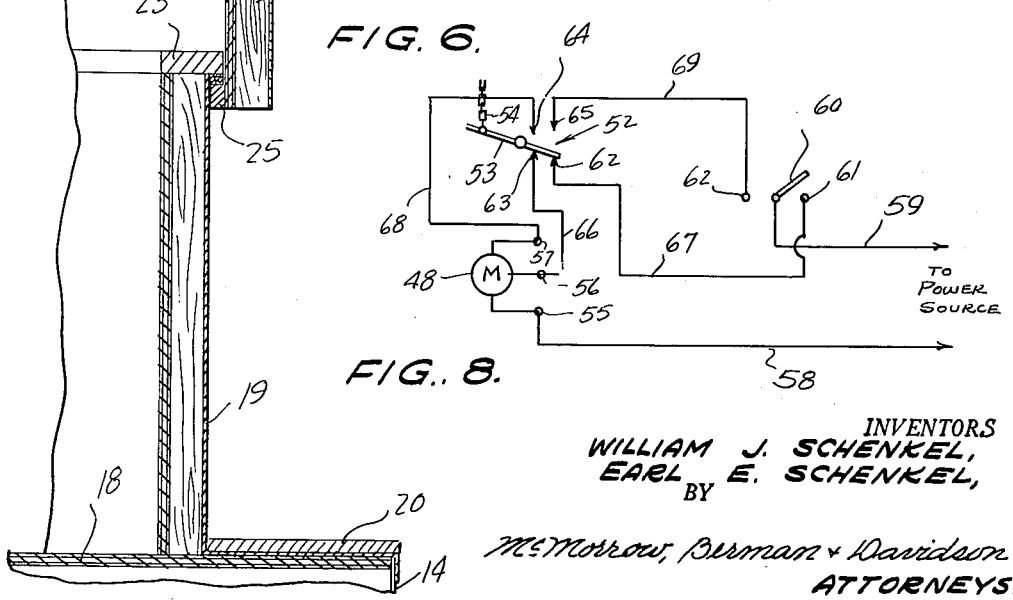

United States Patent Office 2,739,833
Patented Mar. 27, 1956

2,739,833
COLLAPSIBLE ONE AND TWO STORY HOUSE TRAILER

William J. Schenkel and Earl E. Schenkel, Brookville, Ind.

Application September 26, 1952, Serial No. 311,618

5 Claims. (Cl. 296—23)

This invention relates to trailer vehicles, and more particularly to an improved collapsible house trailer having a vertically extensible auxiliary compartment which may be elevated to define a second story for the trailer and which may be collapsed to a position substantially housed in the top portion of the main trailer body when its use is not required.

A main object of the invention is to provide a novel and improved collapsible two story house trailer which is simple in construction, which is easy to operate to elevate or collapse the auxiliary second story compartment thereof, and which provides an extra room for the house trailer when desired, the extensible auxiliary room being arranged so that it may be substantially housed in the top portion of the main body of the trailer without interfering with the utility of the main body of the trailer.

A further object of the invention is to provide an improved collapsible house trailer having a vertically extensible auxiliary compartment which may be employed as a second story compartment for the trailer, the improved trailer involving inexpensive components, being sturdy in construction, and being reliable in operation.

Further objects and advantages of the invention will become apparent from the following description and claims, and from the accompanying drawings, wherein:

Figure 2 is a top plan view of the expanded house trailer of Figure 1.

Figure 3 is a horizontal cross sectional view taken substantially on the line 3—3 of Figure 1.

Figure 4 is an enlarged vertical cross sectional detail view taken on the line 4—4 of Figure 2.

Figure 5 is an enlarged vertical cross sectional detail view taken on the line 5—5 of Figure 2.

Figure 6 is an enlarged cross sectional detail view taken on the line 6—6 of Figure 2.

Figure 7 is a vertical cross sectional detail view similar to Figure 6 but showing the telescopic segments of the expansible auxiliary compartment of the house trailer in collapsed, nesting positions.

Figure 8 is a schematic wiring diagram of the electrical connections which may be employed for the electric motor used to elevate and lower the auxiliary compartment of the house trailer of Figures 1 to 7.

Figure 9 is a fragmentary perspective view showing a method of slidably connecting the telescopic segments of the expansible auxiliary compartment of the house trailer.

Figure 1:
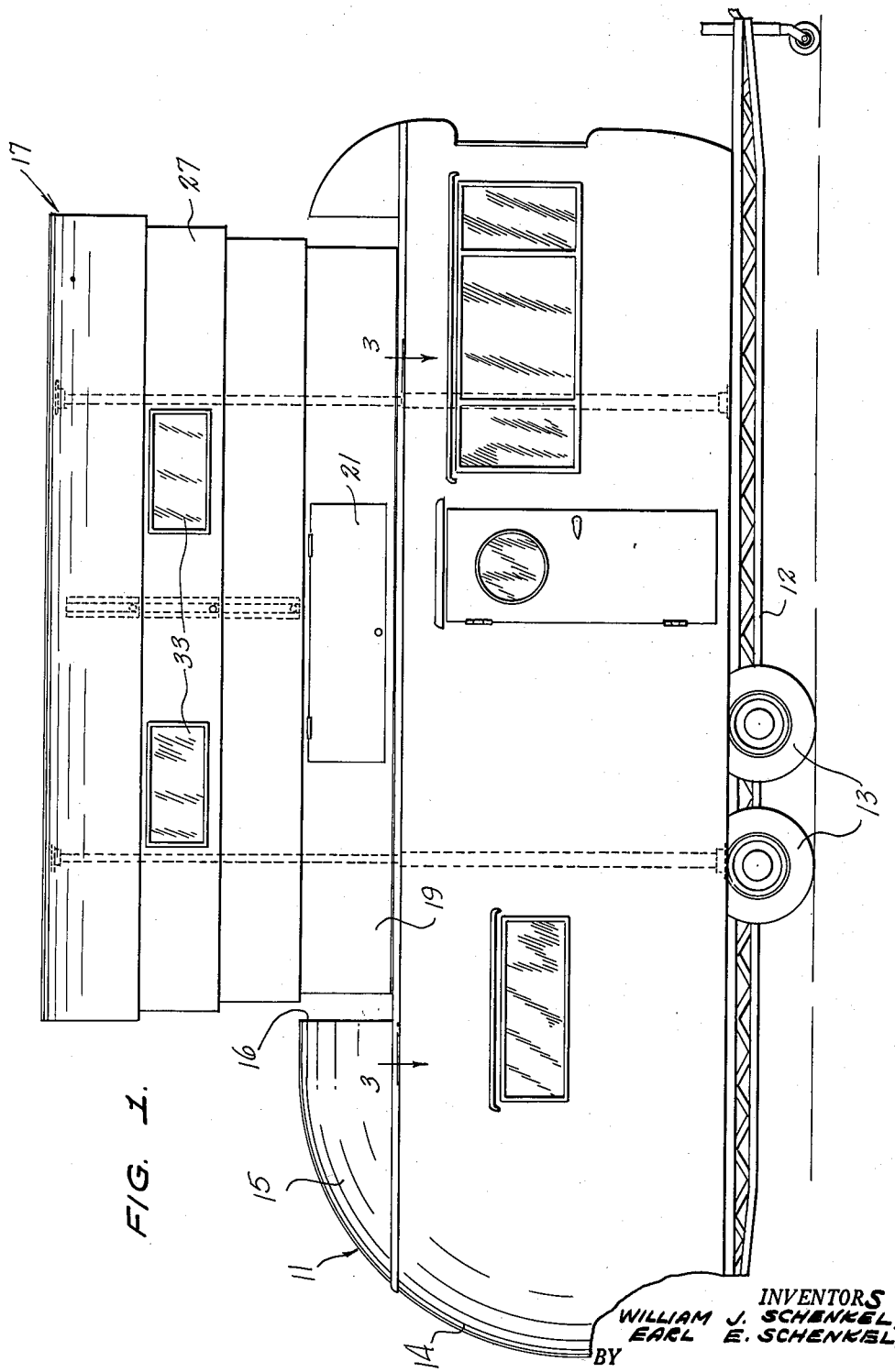
Figure 1 is a side elevational view of an improved house trailer constructed in accordance with the present invention, showing the auxiliary compartment thereof in vertically extended position, defining a second story compartment for the house trailer.

Referring to the drawings, 11 generally designates a house trailer which is mounted on a substantially conventional frame 12 having the ground-engaging wheels 13 supportingly journaled to said frame. The main body of the trailer is designated at 14 and is provided with a roof structure 15 which is recessed at its intermediate portion, as shown at 16, to define a well adapted to house the vertically extensible auxiliary compartment, shown generally at 17, when said compartment is in its collapsed position, as shown in the detail cross sectional view of Figure 7. The aforesaid well comprises a horizontal bottom wall 18 which defines the ceiling of the intermediate portion of the house trailer underlying said well. Rigidly secured to the horizontal wall 18 is the inner upstanding rectangular frame 19 which is secured to the wall 18 in inwardly spaced parallel relationship with the respective longitudinal and transverse margins of said wall, as is clearly shown in Figure 6 and defining a marginal space with respect to the longitudinal side planes of the main body of the house trailer on which is disposed a horizontal supporting strip 20. A similar transversely extending horizontal supporting strip may be provided outwardly adjacent each transverse end wall of the longitudinal frame 19 in the space between the transverse end walls of said frame and the opposing transverse vertical walls of the well above described.

As shown in Figure 1, the frame 19 is provided at one of its side walls with the hinged emergency door 21 which may be employed at times to allow the occupants of the auxiliary room to escape from said auxiliary room in case of emergencies.

Secured to the top edges of the walls of the bottom section 19 are the outwardly projecting rigid stop strips 23. Slidably engaged over the stop strips 23 of the lower rectangular segment 19 is a second rectangular segment 24 which has secured to the inside surface of its bottom marginal portion the abutment strips 25 which are engageable with the stop strips 23 to limit upward extension of the segment 24 with respect to the lowermost segment 19. Secured to the top edges of the segment 24 are the horizontally outwardly projecting stop strips 26. Slidably engaged on the strips 26 is a third vertical rectangular wall segment 27 having secured to the inside surfaces of its lower marginal portions the abutment strips 28 which are cooperable with the stop strips 26 to limit upward extension of the rectangular segment 27 with respect to the subadjacent rectangular segment 24.

Secured to the top edges of the rectangular segment 27 are the outwardly projecting strop strips 29. Slidably engaged on the stop strips 29 is a further vertical rectangular wall section 30 provided at the inside surfaces of its lower marginal portions with the abutment strips 31 engageable with the stop strips 29 to limit upward extension of the rectangular wall section 30. Secured to the top marginal portions of the walls of the section 30 is the roof 32. As shown in Figure 6, the sections 19, 24, 27 and 30 may be extended vertically to define a compartment of substantial height. As is further shown in Figure 7, the sections may be collapsed telescopically to nested positions wherein the over-all height of the collapsed compartment is merely the height of the upper section 30. In the collapsed position of the sections, said sections are housed in the well defined in the roof structure of the main body 14 of the trailer.

As shown in Figure 9, the telescopic segments may be slidably connected by providing opposed pairs of vertical Z-shaped guide plates 70 and 71 on the respective segments which slidably receive the heads of guide bolts 72 extending through the respective upper stop strips 23, 26 and 29. As shown in Figure 9, the stop strips are notched at 73 to provide clearance for the guide plates 70 and 71 and to allow relative vertical movement between the guide plates and the adjacent stop strips.

As is shown in Figure 1, the side walls of the rectangular section 27 may be provided with a plurality of windows 33.

The intermediate portion of the main body of the trailer is provided with a stair well 34, shown in Figure 3, extending through the ceiling 18 and thus communicating with the lowermost section 19 of the vertically extensible auxiliary compartment 17.

Secured to the roof 32 of the auxiliary compartment are a plurality of vertical depending screws 35. The screws 35 are telescopically received in respective sleeves 36 rigidly secured in vertical upstanding positions to the lower portion of the main body 14 of the trailer, as for example, to the floor 37 of said main body. As shown in Figures 4 and 5, the screws 35 extend slidably through the ceiling 18 of the intermediate portion of the main body of the trailer and are threadedly engaged through sprocket wheels 38 which are rotatably supported on the top ends of the sleeves 36, as by the ball bearing units 39. Suitable annular spacer elements 40 may be provided between the ceiling 18 and the sprocket wheels 38. The sprocket wheels 38 are coupled together for simultaneous rotation by a sprocket chain 41 drivingly engaged around the sprocket wheels. Concentrically secured to one of the sprocket wheels 38 between said sprocket wheel and its subadjacent bearing 39, and threadedly engaging with the associated screw 35 is a further sprocket wheel 42. Designated at 43 is a vertical shaft journaled in the intermediate portion of the main compartment of the trailer and having secured to its top end the sprocket wheel 44. Sprocket wheel 44 is drivingly coupled to sprocket wheel 42 by a sprocket chain 45. Secured on the lower end of the shaft 43 is a pulley 46 which is drivingly coupled by a belt 47 to the shaft of an electric motor 48, said motor being of reversible type, and said motor being suitably supported in the intermediate portion of the main body of the trailer in a position to deliver torque to the shaft 43 by means of the belt 47.

As shown in Figure 4, the lower end of shaft 43 may be squared, as shown at 49, whereby said shaft will be rotated by means of a suitable wrench, in the event that it is necessary to elevate or lower the collapsible auxiliary compartment 17 manually.

Secured to the top portion of one of the screws 35 is a bracket 50 provided with a depending, adjustable stop screw 51. Designated at 52 is a reversing switch having the pivoted arm 53 which is connected to the end of the bracket 50 by means of a chain 54. The reversing switch 52 is employed to automatically deenergize the motor 48 when the auxiliary compartment 17 has been raised or lowered to its extreme positions.

The motor 48 may be connected in a circuit such as shown in Figure 8, providing the aforesaid automatic control of the motor. The motor may be of the conventional type having respective reversing windings and having the respective terminals 55, 56 and 57. The terminal 55 is connected by a wire 58 to one pole of the power source, such as one terminal of the vehicle battery. The other terminal of the vehicle battery may be connected by a wire 59 to the movable pole 60 of a manually operated single pole double throw switch having the respective fixed contacts 61 and 62. The automatic switch 52 has the pivoted pole 53 which is bridgingly engageable in one position thereof with the bottom contacts 62 and 63 and is bridgingly engageable in the opposite position thereof with the pair of upper contacts 64 and 65. One of the windings of the motor 48 is connected by wires 66 and 67 through the contacts 63 and 62 to the terminal 61 of the single pole double throw manually operated switch. The other winding of motor 48 is connected by wires 68 and 69 through the contacts 64 and 65 to the remaining stationary terminal 62 of the single pole double throw manually operated switch. It will be seen from Figure 8 that when the pole 60 of the manually operated switch is engaged with the contact 61, with the auxiliary compartment in fully elevated position, namely, the position wherein the automatic switch pole 53 engages the contacts 62 and 63, an energizing circuit is completed for the motor 48 through the wire 59, the switch pole 60, the wire 67, the switch pole 53, the wire 66, the winding of the motor 48 and the wire 58, to the vehicle battery.

This completes the energizing circuit for energizing the motor 48 in a direction to lower the auxiliary compartment. The sprocket wheel 42 is thus driven by the sprocket chain 45 to rotate the sprocket wheels 38 and thus cause descent of the screws 35, lowering the respective sections of the auxiliary compartments 17. When the sections have been completely lowered, to the positions thereof illustrated in Figure 7, the stop screw 51 engages the end of the switch pole 53, causing said switch pole to be rotated counterclockwise, as viewed in Figure 4, to a position wherein the contacts 63 and 62 are opened and the contacts 64 and 65 are closed. The opening of contacts 62 and 63 deenergizes the motor 48, and at the same time the contacts 64 and 65 are bridged, thus establishing a circuit which will be completed for energizing the other winding of the motor 48 when the switch pole 60 of the manually operated switch is rotated into engagement with the stationary contact 62 of said manually operated switch. This is done when it is desired to elevate the auxiliary compartment to its expanded position. When the pole 60 is engaged with the contact 62, an energizing circuit for the elevating winding of the motor 48 is completed through wire 59, pole 60, wire 69, switch arm 53, wire 68, the winding of motor 48, and wire 58 to the vehicle battery. Energization of the elevating winding of motor 48 causes the motor to rotate the sprocket wheels 38 in a direction to elevate the screws 35 and thus lift the roof section of the auxiliary compartment. As the roof section is elevated the inner sections 27 and 24 are likewise elevated, until the auxiliary compartment has reached its fully expanded position, at which point the chain 54 rotates the switch arm 53 clockwise, as viewed in Figure 4, thus opening the contacts 64 and 65. The motor 48 thus becomes deenergized and the circuit is established for lowering the auxiliary compartment when the switch arm 60 is rotated into engagement with the stationary contact 61, as above described.

As previously mentioned, should the motor 48 be inoperative due to a power failure or the like, the mechanism may be manually operated by means of a wrench engaged with the squared end 49 of shaft 43.

It will be readily apparent that the trailer may be employed either in elevated or collapsed position, and that when the auxiliary compartment is in its collapsed position, it is substantially completely housed in the roof structure of the main body of the trailer and is thus in a substantially non-obstructing position.

While a specific embodiment of an improved collapsible house trailer has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle including a frame and ground engaging wheels supportingly journaled to said frame, a main body having a ceiling panel and a roof structure extending over said ceiling panel, said roof structure being provided with an intermediate recess which together with the adjacent portion of said ceiling panel defines a well, a plurality of wall members having one of said members provided with a roof covering same arranged in nested relation positioned within said well so that they are supported upon the portion of said ceiling portion defined by said well and connected together for movement from their nested position to an expanded position and form with said ceiling panel portion an auxiliary compartment, jack means mounted on said body and operatively connected to said wall members for shifting said wall members to the expanded position and form with said ceiling panel portion an auxiliary compartment, said wall members having a height approximately equal to the depth of said well, and means arranged to support said wall members in their nested relation in said well in substantially flush relationship with the roof structure of said main body.

2. In a vehicle including a frame and ground engaging wheels supportingly journaled to said frame, a main body having a ceiling panel and a roof structure extending over said ceiling panel, said roof structure being provided with an intermediate recess which together with the adjacent portion of said ceiling panel defines a well, a plurality of wall members having one of said members provided with a roof covering same arranged in nested telescopic relation positioned within said well so that they are supported upon the portion of said ceiling panel defined by said well and connected together for movement from their nested telescoping position to an expanded position and form with said ceiling panel portion an auxiliary compartment, jack means mounted on said body and operatively connected to said wall members for shifting said wall members to the expanded position and form with said ceiling panel portion an auxiliary compartment, said wall members having a height approximately equal to the depth of said well, and means arranged to support said wall members in their nested relation in said well in substantially flush relationship with the roof structure of said main body.

3. In a vehicle including a frame and ground engaging wheels supportingly journaled to said frame, a main body having a ceiling panel and a roof structure extending over said ceiling panel, said roof structure being provided with an intermediate recess which together with the adjacent portion of said ceiling panel defines a well, a plurality of wall members having one of said members provided with a roof covering same arranged in nested telescoping relation positioned within said well so that they are supported upon the portion of said ceiling panel defined by said well and connected together for movement from their nested telescoping position to an expanded position and form with said ceiling panel portion an auxiliary compartment, jack means mounted on said body and operatively connected to said wall members for shifting said wall members to the expanded position and form with said ceiling panel portion an auxiliary compartment, cooperating stop means on said wall members limiting upward relative displacement of the wall members, and said wall members having a height approximately equal to the depth of said well, and means arranged to support said wall members in their nested relation in said well in substantially flush relationship with the roof structure of said main body.

4. In a trailer vehicle including a frame and ground engaging wheels supportingly journaled to said frame, a main body having a ceiling panel and a roof structure extending over said ceiling panel, said roof structure being provided with an intermediate recess which together with the adjacent portion of said ceiling panel defines a well, a plurality of wall members having one of said members provided with a roof covering same arranged in nested telescoping relation positioned within said well so that they are supported upon the portion of said ceiling panel defined by said well and connected together for movement from their nested telescoping position to an expanded position and form with said ceiling panel portion an auxiliary compartment, jack means mounted on said body and operatively connected to said wall members for shifting said wall members to the expanded position and form with said ceiling panel portion an auxiliary compartment, said jack means comprising a plurality of vertically depending screws secured to the roof of said one wall member, respective vertical sleeves secured to said body and receiving said screws, respective nuts threaded on the screws and rotatively bearing on the sleeves, and means simultaneously rotating the nuts, cooperating stop means on said wall members limiting upward relative displacement of the wall members, and means arranged to support said wall members in nested relation in said well in substantially flush relationship with the roof structure of said main body.

5. In a trailer vehicle including a frame and ground engaging wheels supportingly journaled to said frame, a main body having a ceiling panel and a roof structure extending over said ceiling panel, said roof structure being provided with an intermediate recess which together with the adjacent portion of said ceiling panel defines a well, a plurality of wall members having one of said members provided with a roof covering same arranged in nested telescopic relation positioned within said well so that they are supported upon the portion of said ceiling panel defined by said well and connected together for movement from their nested position to an expanded position and form with said ceiling panel portion an auxiliary compartment, jack means mounted on said body and operatively connected to said wall members for shifting said wall members to the expanded position and form with said ceiling panel portion an auxiliary compartment, said jack means comprising a plurality of vertically depending screws secured to the roof of said one wall member, respective vertical sleeves secured to said body and receiving said screws, respective sprocket wheels threadedly engaged on the screws and rotatively bearing on the sleeves, a sprocket chain drivingly coupling the sprocket wheels for simultaneous rotation, an electric motor mounted on the body, and means drivingly connecting said motor to one of the sprocket wheels, said wall members having a height approximately equal to the depth of said well, and means arranged to support said wall members in their nested relation in said well in substantially flush relationship with the roof structure of said main body.

References Cited in the file of this patent

UNITED STATES PATENTS

| 550,518 | Miller | Nov. 26, 1895 |
| 1,852,984 | Smith | Apr. 5, 1932 |
| 1,964,894 | Rohne | July 3, 1934 |
| 2,193,352 | Thomas | Mar. 12, 1940 |
| 2,485,475 | Brenneman | Oct. 18, 1949 |
| 2,506,870 | Hairston | May 9, 1950 |
| 2,561,921 | Guillot | July 24, 1951 |

FOREIGN PATENTS

| 493,762 | Germany | Mar. 14, 1930 |
| 304,802 | Great Britain | Jan. 28, 1929 |
| 323,160 | Great Britain | Dec. 24, 1929 |